C. RYAN.
NUT LOCK.
APPLICATION FILED SEPT. 30, 1912.
1,064,934.
Patented June 17, 1913.
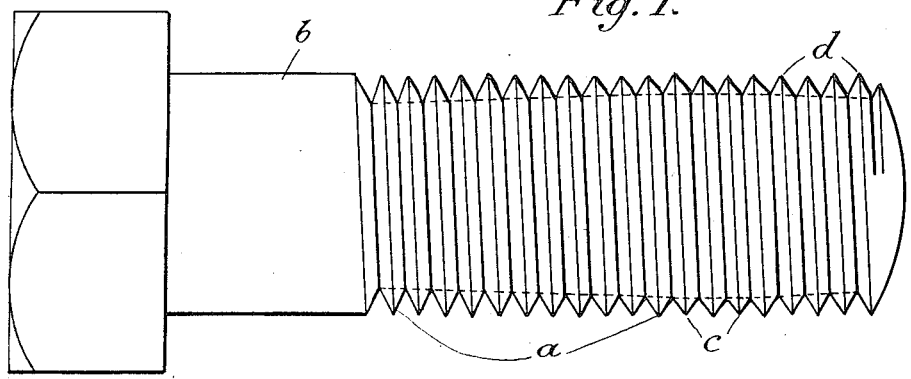
Fig. 1.
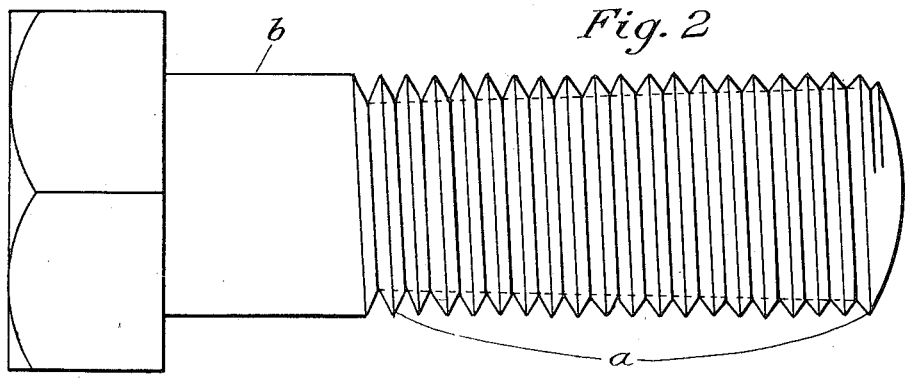
Fig. 2.
Fig. 3.
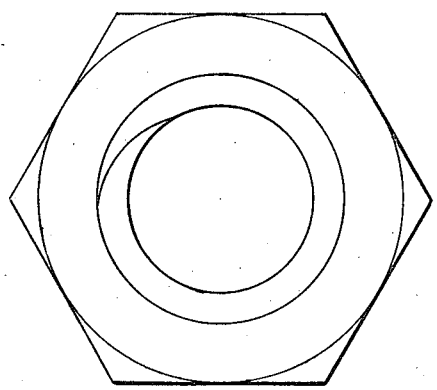
Witnesses:
Theo. Lagaard
H. A. Bowman
Inventor:
Catherine Ryan.
By F. A. Whiteley
her Attorney.

UNITED STATES PATENT OFFICE.

CATHERINE RYAN, OF ST. PAUL, MINNESOTA.

NUT-LOCK.

1,064,934.

Specification of Letters Patent.

Patented June 17, 1913.

Application filed September 30, 1912. Serial No. 723,103.

*To all whom it may concern:*

Be it known that I, CATHERINE RYAN, a citizen of the United States, residing at St. Paul, in the county of Ramsey and State of Minnesota, have invented certain new and useful Improvements in Nut-Locks, of which the following is a specification.

My invention relates to nut locks, and has in view particularly to provide such a device in which the essential locking element consists in a peculiar formation of the threads of the bolt such that a nut of any formation whatever having at least a portion of its threads formed to coöperate with such bolt formation to cause the nut to turn with difficulty over the same thereafter turning more easily toward the unthreaded portion of the bolt.

In the drawings, Figures 1 and 2 illustrate two bolts each employing a thread structure involving my invention. Fig. 3 is a plan view of a nut having threads thereof adapted to coöperate with the bolt to effect the aforesaid locking action. The forms of bolts shown in Figs. 1 and 2 are substantially the same as far as the principle of my invention is concerned. In Fig. 1 a series of teeth *a* continuously increase in depth to the unthreaded portion *b* of the bolt, said threads *a* extending from threads *c* intermediate the end of the unthreaded portion which are the shallowest threads of the bolt, a short series of threads *d* gradually increasing in depth from the threads *c* to the outer end of the bolt to permit ready introduction of the nut upon the bolt. In the form of bolt shown in Fig. 2 the threads *a* extend from the end of the bolt to the unthreaded portion constantly increasing in depth throughout the extent of the threaded portion of the bolt.

Various forms of nuts may be employed in connection with bolts involving my invention, it only being necessary that some of the threads of the nut shall be so formed as to sink in to the shallowest portion of the bolt. Such a nut may have its interior normally straight walled and cylindrical or tapering from one side of the nut to the other. In either of these cases the threads may be normal threads, or may be threads having one side more oblique than the other. The threads may be cut off at the tops so as to have flat tops either entirely across the threaded portion of the nut or across a portion of the threaded portion of the nut, or the threads may have pointed tops or blunt tops part or all of the way through the interior of the nut, or the nut may have threads progressively increasing in depth from one side of the nut to the other or only part way through the nut, and the interior of the nut may be cylindrical for a part of the distance and tapering the balance of the distance, if desired. In cases where the outer limits of the most exposed threads of the nut are such as to have a diameter considerably less than the inner limits of the shallowest threads of the bolt, the nut may, if desired, be provided with three or more less clefts in the interior thereof to permit slight expansion.

Whatever the type of nut employed the principle of operation is identically the same, namely, a certain thread or threads of the nut in relation to the shallowest threads of the bolt are such as to sink in to the material of the bolt to some extent as said threads are driven over the bank of shallowest threads in the bolt; and after such nut threads have passed the said bank the nut will tend to turn more easily toward the unthreaded portion of the bolt and therefore will always tighten to its work instead of loosening, with the result that the nut is in effect locked upon the bolt.

By the use of a solid nut in combination with progressively deepening threads an effect is obtained which is impossible to be obtained by the use of a split nut. It requires more power to drive the solid nut over the shallowest threads, but the nut cannot thereby be expanded permanently, and will cling to and grip the threads beyond the shallow threads, having the effect of constantly tending to turn in toward the unthreaded portion of the bolt, so that the shallow threads have the effect of absolutely locking the nut upon the bolt.

I claim:

A bolt having a series of threads growing progressively deeper toward the unthreaded portion of the bolt, in combination with a closed nut having a thread or threads so formed in relation to the shallowest threads of the bolt that said nut thread or threads will sink into and clasp the material of the bolt as the same is turned over the bank formed by the shallow threads, and nut tending to turn toward the unthreaded portion of the bolt after passing said bank of shallowest threads and said bank of shallowest threads acting as a lock to hold the nut upon the bolt.

In testimony whereof I affix my signature in presence of two witnesses.

CATHERINE RYAN.

Witnesses:
F. A. WHITELEY,
H. A. BOWMAN.